United States Patent [19]

Tamura et al.

[11] Patent Number: 4,992,973
[45] Date of Patent: Feb. 12, 1991

[54] DATA TRANSMISSION APPARATUS WITH LOOPBACK TOPOLOGY

[75] Inventors: Toshiyuki Tamura; Shinji Komori; Hidehiro Takata, all of Itami; Tetsuo Yamasaki, Amagasaki; Hiroaki Terada, Suita; Katsuhiko Asada, Amagasaki, all of Japan

[73] Assignee: Mitsubishi Denki Kabushiki Kaisha, Tokyo, Japan

[21] Appl. No.: 217,002

[22] Filed: Jul. 8, 1988

[30] Foreign Application Priority Data

Jul. 15, 1987 [JP] Japan .................. 62-177836

[51] Int. Cl.$^5$ .................................... G06F 13/00
[52] U.S. Cl. ........................... 364/900; 364/926.5; 364/935; 364/935.2; 364/950.1; 364/960; 364/948.34; 365/78; 377/64
[58] Field of Search ... 364/200 MS File, 900 MS File; 377/66, 64; 365/78

[56] References Cited

U.S. PATENT DOCUMENTS

| | | | |
|---|---|---|---|
| 3,300,724 | 1/1967 | Cutaia | 377/66 X |
| 3,540,004 | 11/1970 | Hansen | 364/900 |
| 3,735,362 | 5/1973 | Ashany et al. | 364/200 |
| 3,748,647 | 7/1973 | Ashany et al. | 364/200 |
| 4,156,288 | 5/1979 | Spandorfer | 377/66 X |
| 4,176,400 | 11/1979 | Heckel | 364/900 |
| 4,649,512 | 3/1987 | Nukiyama | 364/900 |

OTHER PUBLICATIONS

"The Bipolar Digital Integrated Circuits Data Book for Design Engineers", (Part 2), Texas Instruments, 1982, vol. 17, pp. 57-62.

Primary Examiner—Gareth D. Shaw
Assistant Examiner—Paul Kulik
Attorney, Agent, or Firm—Townsend and Townsend

[57] ABSTRACT

A data transmission apparatus which is connected with a shift register of a plural stages forming a forward path of data transmission line, and a shift register of a plural stages forming a backward path of the same, and a loop-back part therebetween, and comprises bypasses between the shift register on the forward path and on the backward path to bypass the transmitted data when significant data does not exist on the loop-back part side from a stage on which the bypass is comprised and no data stays at a stage where the bypass is comprised, so that data is transmitted at high speed, and which is constructed to be able to control the bypass from external, so that testing of circuitry is easy.

20 Claims, 6 Drawing Sheets

DATA TRANSMISSION APPARATUS WITH LOOPBACK TOPOLOGY

BACKGROUND OF THE INVENTION

1. Field of the Invention

This invention relates to a data transmission apparatus principally performing data transmission between systems making asynchronous operations, and further to be detailed, relates to a data transmission apparatus capable of controlling transmission of data corresponding to the state of sending data on the side of the system outputting the data.

2. Description of the Prior Art

Conventionally, for a data transmission apparatus, for example, the data transfer control circuit of FIFO (First-In First-Out) memory has been known. As an example thereof, FIG. 1 shows a configuration of an asynchronous FIFO memory as shown in "The Bipolar Digital Integrated Circuits Data Book for Design Engineer Part 2" (TEXAS INSTRUMENTS, 1982, Vol. 17, p61).

In this example, two-stage latches are used. This means that numerals 42 and 43 in the figure designate data latches, which are connected by a four-bit data line. Also, numerals 44 and 45 designate control circuits, and the control circuit 44 controls the data latch 42 and the control circuit 45 controls the data latch 43, respectively.

Numeral 46 designates a one-shot pulse circuit using a D-flip-flop, and when a high active reset signal RESET is low ("0"), that is, where a high-level write request pulse signal (data transfer request signal) "PUSH" is given when the high level ("1") is given to a data terminal D, a high-level SEND signal (data transfer request signal) S1 is outputted from an output terminal Q thereof.

This SEND signal S1 is given to the data latch 42 as a high-level signal L1 and is transmitted to the control circuit 45 of the next stage as a SEND signal S2.

The data latch 42 is given the high-level signal L1, and thereby latches a data D1 given from the preceding stage side, and outputs it to the data latch 43 of the following stage side as a data D2.

The high-level SEND signal S2 given to the control circuit 45 is given to the data latch 43 as a high-level signal L2, and is further given to a control circuit (not illustrated) of the following stage as a high-level SEND signal S3.

The data latch 43 is given the high-level signal L2, and thereby latches the data D2 from the data latch 42 of the preceding stage, and further outputs it to the following stage as a data D3.

Accordingly, as shown in FIG. 2, a data constituted with a word 1 and a word 2 is transmitted in the sequence of the data latches 42, 43.

Then, in such a conventional data transmission apparatus, the number of stages of data latches is fixed and does not vary during data transmitting operation, and therefore the time required for transmitting data to be transmitted is constant irrespective of the amount of the data. Accordingly, the following problems are raised in the case where the data transmission apparatus as described above is used for data transmission between two systems performing asynchronous operation.

(1) In the case where the number of stages of the FIFO memory is large, when the amount of data to be transmitted between two systems is small, a long time is required for data transmission in comparison with the amount of data.

(2) In the case where the number of stages of the FIFO memory is small, when the amount of data to be transmitted between two systems is large, a non-smooth flow of data caused by asynchronous operations cannot be buffer-stored, resulting in an overflow.

SUMMARY OF THE INVENTION

The present invention has been achieved in light of such circumstances, and the principal object thereof is to provide a data transmission apparatus capable of quick and smooth data transmission irrespective of the number of stages of a shift register and the amount of data to be transmitted.

A data transmission apparatus in accordance with the present invention adopts a configuration wherein bypasses are installed between a forward path and a backward path which are formed by connecting multi-stage shift register to a loop-back part, and a first detecting means detecting whether or not a significant data exists on the loop-back part side from a bounding which is a stage of the shift register where each bypass is formed and a second detecting means detecting whether or not data existing at a stage of the shift register of the backward path where each bypass is installed is stopped, are provided, and data is bypassed by opening the bypass in the case where presence of a significant data is not detected by the first means and stop of data is not detected by the second means.

Also, as a second invention, a configuration is adopted wherein the above-described bypass can be opened and closed by external control.

The above and further objects and features of the invention will more fully be apparent from the following detailed description with accompanying drawings.

DESCRIPTION OF THE PREFERRED EMBODIMENTS

Hereinafter, detailed description is made on the present invention in reference to the drawings showing embodiments thereof.

Figure 3:
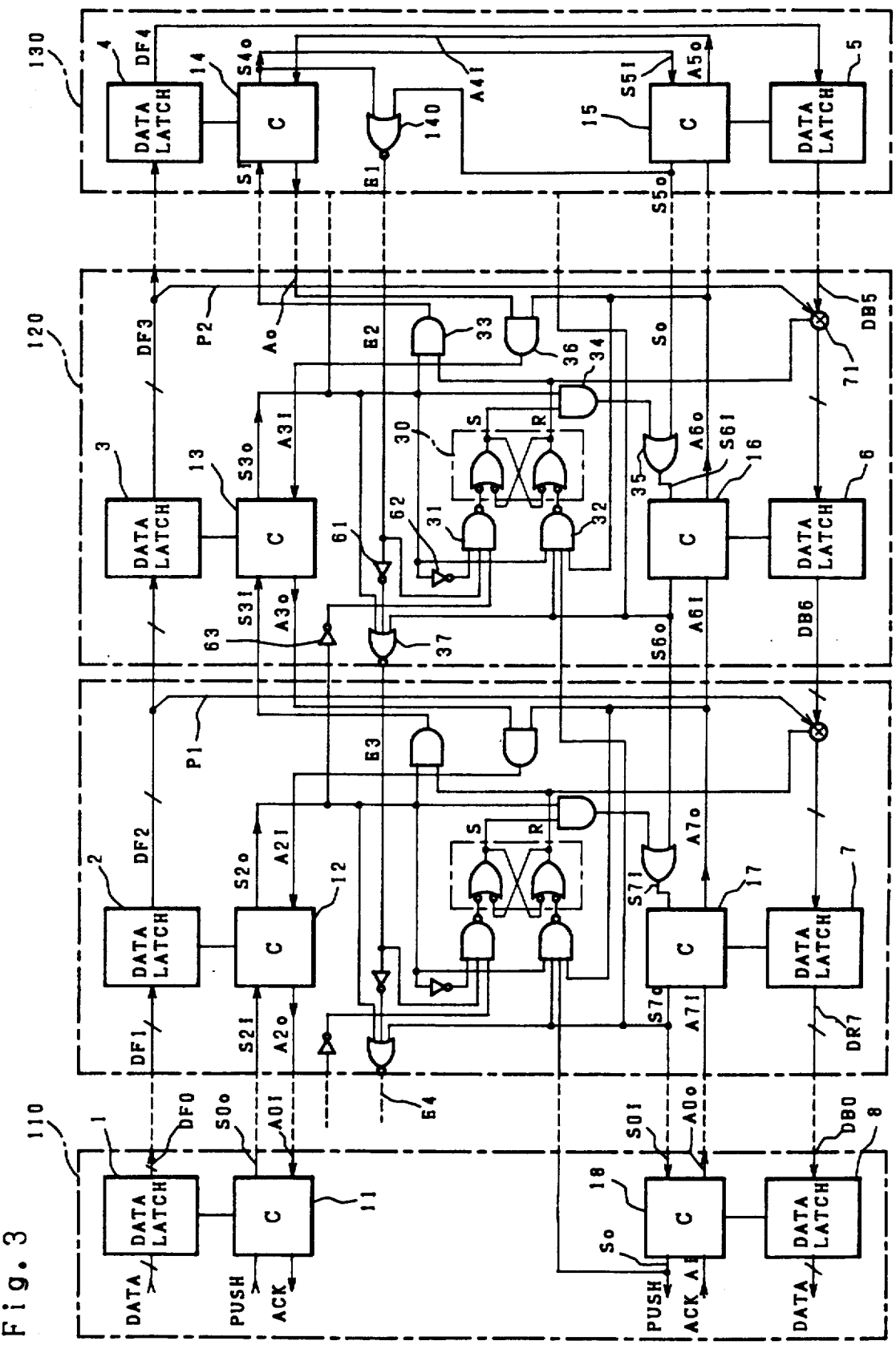
FIG. 3 is a circuit diagram showing an example of configuration of a data transmission apparatus in accordance with a first invention of the present invention.

FIG. 3 is a block diagram showing a configuration of one embodiment of a data transmission apparatus in accordance with the present invention.

In the figure, numeral 110 designates a data input/output part, and numeral 130 designates a loop-back part of a shift register. Also, numeral 120 designates a configuration unit of a repetitive configuration, and a plurality of these units are arranged in series between the data input/output part 110 located on the left side in the figure and the loop-back part 130 located on the right side. Numerals 1 to 4 designate data latches constituting each stage of the shift register on the forward path of the data input/output part 110, the configuration units 120 and the loop-back part 130 respectively, and numerals 5 to 8 designate data latches constituting each stage of shift register on the backward path likewise.

Numerals 11 to 18 designate transfer control parts (C in the diagram) controlling the above-described data latches 1 to 8 respectively. In addition, this transfer control part C has a publicly known configuration similar to the control circuit of the above-described conventional example.

Symbols So (S2o, S3o, S6o, S7o etc.) designates output lines of SEND signals designated by the corresponding symbols respectively, symbols Si (S2i, S3i, S6i, S7i etc.) designate input lines of SEND signals designated by the corresponding symbols respectively, symbols Ao (A2o, A3o, A6o, A7o etc.) designate output lines of ACK signals designated by the corresponding symbols, and symbols Ai (A2i, A3i, A6i, A7i etc.) designate input lines of ACK signals designated by the corresponding symbols.

In addition, in this embodiment, the SEND signals are in the active state at the high level "1", and the ACK signals are in the active state at the low level "0".

Each configuration unit 120 of the repetitive configuration is configured as follows.

A data line DF2 from the data latch 2 on the data input/output part 110 side and a data line DF3 to the data latch 4 on the loop-back part 130 side are connected to the data latch 3 on the forward path. On the other hand, a data line DB5 from the data latch 5 on the loop-back part 130 side and a data line DB6 to the data latch 7 on the data input/output part 110 side are connected to the data latch 6 on the backward path. Then, a switching means 71 is inserted to the data line DB5 on the backward path, and a bypass P (P2) is connected between the data line DF3 on the forward path and the switching means 71.

The SEND signal input line Si (S3i) from the data input/output part 110 side and the ACK signal output line Ao (A3o) to the data input/output part 110 side are connected to the data input/output part 110 side of the transfer control part 13 on the forward path. Also, the SEND signal output line So (S3o) to the loop-back part 130 side and the ACK signal output line Ao from the loop-back part 130 through an AND gate 36 are connected to the loop-back part 130 side of the transfer control part 13 as the ACK signal input line Ai (A3i).

The ACK signal input line Ai (A6i) from the data input/output part 110 side and the SEND signal output line So (S6o) to the data input/output part 110 side are connected to the data input/output part 110 side of the transfer control part 16 on the backward path. Also, the ACK signal output line Ao (A6o) to the loop-back part 130 side and the SEND signal output line So from the loop-back part 130 side through an OR gate 35 are connected to the loop-back part 130 side of the transfer control part 16 as the SEND signal input line Si (S6i). Also, the ACK signal output line Ao (A6o) is connected to one of inputs of the AND gate.

Latch signals are given respectively to the data latches 3 and 6 from the transfer control parts 13 and 16, and thereby the respective data latches 3 and 6 latch data given from the data line DF2 on the data input/output part 110 side and the data line on the loop-back part 130 side respectively, and output the data to the data line DF3 on the loop-back part 130 side or the data line DB7 on the data input/output part 110 side.

Numerals 30 designates a flip-flop as a control circuit of the bypass, and a set output S thereof is connected to the transfer control part 16 on the backward path through an AND gate 34 and the OR gate 35. Also, a reset output R is connected as the SEND signal input line Si to the transfer control part C on the loop-back part 130 side through an AND gate 33, and is connected to the switching means 71 as an open/close control signal.

To both inputs of the flip-flop 30, outputs of NAND gates 31 and 32 as the second detecting means are connected, respectively.

The NAND gate 31 has three inputs, and to the respective inputs, the SEND signal output line So (S3o) of the transfer control part 13 on the forward path of its own stage is connected through an inverter 62, an output signal line E (E2) from the loop-back part 130 side is connected, and the SEND signal output line So (S2o) of the transfer control part 12 on the forward path on the data input/output part 110 side is connected through an inverter 63, respectively.

The NAND gate 32 has four inputs, and to the respective inputs, the SEND signal output line So (S3o) of the transfer control part 13 on the forward path of its own stage, the SEND signal output line So (S6o) of the transfer control part C (16) on the backward path of its own stage, the SEND signal output line So (S7o) of the transfer control part C (17) on the backward path of the data input/output part 110 side and the ACK signal output line Ao (A6o) of the transfer control part 16 on the backward path of its own stage are connected respectively.

To the other input of the AND gate 33, the SEND signal output line So (S3o) of the transfer control part 13 of the its own stage is connected, and the output thereof is connected to the transfer control part C (14) on the forward path of the loop-back part 13o side as the SEND signal input line Si.

To the other input of the AND gate 34, the SEND signal output line So (S3o) of the transfer control part 13 is connected, and the output thereof becomes the SEND signal input line Si (S6i) of the transfer control part 16 on the backward path of its own stage through the OR gate 35.

The AND gate 36 has two inputs, and to one of the inputs, as described above, the SEND signal output line So (S6o) of the transfer control part 16 on the backward path of its own stage is connected, and to the other input, the ACK signal output Ao of the loop-back part 130 side is connected, and the output thereof becomes the ACK signal input line Ai (A3i) of the transfer control part 13 on the forward path of its own stage.

A NOR gate 37 as the first detecting means has three inputs, and to the respective inputs, the SEND signal output line So (S3o) of the transfer control part 13 on the forward path of its own stage is connected, as empty signal E (E1) is connected as E2 from the loop-back part 130 side through an inverter 61, and the SEND signal output line So (S6o) of the transfer control part 16 on the backward path of its own stage is connected respectively. The output of this NOR gate 37 is outputted as an empty signal E3 to the data input/output part 110 side. This means that the NOR gate 37 is operated as the first detecting means of the first stage from the loop-back part 130 side (configuration unit 120).

Configuration of the data input/output part 110 is as follows.

The data latch 1 and the transfer control part 11 controlling it are provided on the forward path side. To the data latch 1, a line for inputting data and a data line DF0 for outputting data to the data latch on the forward path of the configuration unit 120 on the repetitive configuration side are connected.

To the transfer control part 11, a line for inputting the transfer request signal PUSH and ACK signal output line are connected, and the SEND signal output line So (S0o) and the ACK signal input line Ai (A0i) are connected to the transfer control part C side of the configuration unit 120 on the repetitive configuration side. These signal lines become the SEND signal input line Si and the ACK signal output line Ao of the transfer control part C of the configuration unit 120 on the repetitive configuration side.

Accordingly, when a data transfer request signal PUSH is given to the transfer control part 11, the transfer control part 11 outputs a high-level transfer signal to the SEND signal output line S0o, and outputs a latch signal to the data latch 1. Thereby, the data latch 1 latches data to be transmitted and outputs it to the data line DF0 on the loop-back part 130 side.

On the other hand, the backward path side is also provided with the data latch 8 and the transfer control part 18 controlling it.

To the data latch 8, a data line DB0 whereto data from the configuration unit 120 of the repetitive part is inputted and a data line DB outputting the inputted data to other are connected. Also, to the transfer control part 18, a SEND signal input line S0i and an ACK signal output line A0o are connected to the configuration unit 120 side of the repetitive part, and the SEND signal output line So and the ACK signal input line Ai are connected to the other side.

Configuration of the loop-back part 130 is as follows.

The loop-back part 130 is provided with the data latch 4 on the forward path, the transfer control part 14 for controlling it, the data latch 5 on the backward path and the transfer control part 15 for it, and a data line DF4 is connected between the data latch 4 and the data latch 5. Also, a SEND signal output line S4o of the transfer control part 14 becomes a SEND signal input line S5i of the transfer control part 15, and an ACK signal output line A5o of the transfer control part 15 becomes an ACK signal input line A4i of the transfer control part 14. Also, the SEND signal output line S4o of the transfer control part 14 and a SEND signal output line S5o of the transfer control part 15 are connected to two inputs of a NOR gate 140, and the output of this NOR gate 140 becomes the empty signal E (E1).

Next, description is made on operation.

First, semantic description is made on output signal lines E1 to E4 of the respective NOR circuits (37, 140 and the like). The SEND output So of the transfer control part C goes to "1" when a significant data is held in the data latch controlled by each transfer control part C (hereafter referred to as "data is present"), and goes to "0" when not held, and therefore the signal line E1 goes to "1" when no significant data is held in both of the data latches 4 and 5 of the loop-back part 130 (hereafter referred to as "data is absent").

The signal line E3 goes to "1" by the NOR circuit 37 only when the signal line E2 is "1" and the data latches 3 and 6 are both in the state of "data is absent", that is, the SEND output lines So of the transfer control parts 13 and 16 are both "0", and goes to "0" in the cases other than the above-mentioned.

This means that the signal line E3 goes to "1" only when all the data latches in one configuration unit 120 of the repetitive part and on the loop-back part 130 side therefrom (right side in the figure) are in the state of "data is absent" (hereafter referred to as "empty line"). The same is true of the signal line E4.

Next, description is made on operation of this embodiment aiming at one configuration unit 120 of the repetitive part.

First, description is made on the states of control corresponding to the cases where the flip-flop 30 being a controlling means of the bypass is in the set state and in the reset state.

(i) The case where the flip-flop 30 is in the set state (S output: "1", R output: "0")

Since the "active state" of the SEND signal and the ACK signal sent and received between the adjacent transfer control parts C are assumed to be "1" and "0" respectively, the active state "1" of the SEND output line S3o of the transfer control part 13 is not transmitted to the SEND input line of the transfer control part 14 by the AND circuit 33, and is transmitted to the SEND input line S6i of the transfer control part 16 by the AND circuit 34 and the OR circuit 35.

Simultaneously, the active state "0" of the ACK output line A6o of the transfer control part 16 is transmitted to the ACK input line A3i of the transfer control part 13 by the AND circuit 36, and the transfer control parts 13 and 16 are put in the "handshake" state. Simultaneously, since the control input of the switching means 71 (reset output R of the flip-flop 30) is "0", data from the bypass P2 is transmitted to a data line DB5 connected to the data latch 6.

Accordingly, in the case where the flip-flop 30 is in the set state, when data is inputted from the input/output part 110 and is transferred to the data latch 3, it is transferred to the corresponding data latch 6 on the backward path through the bypass P2 (hereafter referred to as "bypass state").

(ii) The case where the flip-flop 30 is in the reset state (S output: "0", R output: "1").

Since one of inputs of the AND circuit 34 (set output S of the flip-flop 30) is "0", the active state "1" of the SEND output line S3o of the transfer control part 13 is not transmitted to the SEND input line S6i of the transfer control part 16, and on the other hand, since one of input lines of the AND circuit 33 (reset output R of the flip-flop 30) is "1", it is transmitted to the SEND signal line to the stage on the loop-back part 130 side. Also, the active state "0" of the ACK output line Ao outputted from the stage on the loop-back 130 side is transmitted to the ACK input line A3i of the transfer control part 13 through the AND circuit 36, and the transfer control part 13 and the transfer control part C on the loop-back part 130 side are put in the "handshake" state. Simultaneously, since the control input line of the swiching means 71 (reset output R of the flip-flop 30) is "1", data from the bypass P2 is transmitted to the data line DB5 connected to the data latch 6.

Also, the active state "1" of the SEND output line So outputted from the transfer control part C on the backward path on the loop-back part 130 side is transmitted to the SEND input line S6i of the transfer control part 16 through the OR circuit 35, and the active state "0" of the ACK output line A6o of the transfer control part 16 is transmitted to the ACK input line Ai of the transfer control part C on the loop-back part 130 side, and thereby the transfer control part 16 and the transfer control part C on the loop-back part 130 side are put in the "handshake" state.

Accordingly, in the case where the flip-flop 30 is in the reset state, data inputted from the input part is transferred to the data latch 3, and thereafter it is transferred to the data latch on the forward path on the loop-back 130 side, and data transferred from the data latch on the backward path on the loop-back 130 side is transferred to the data latch 6 (hereafter referred to as "bypass inhibit state").

Next, further detailed description is made on operation of this embodiment aiming at the configuration unit 120.

In the initial state, the SEND line of each transfer control part is "0" and the ACK line thereof is "1", and therefore the empty signal line E2 is "1", and the other two inputs of the three-input NAND circuit 31 both go to "1" by the inverting circuits 62 and 63, and the output of this three-input NAND circuit 31 goes to "0". On the other hand, since the SEND output line S3o of the transfer control part 13 is "0", the output of the four-input NAND circuit 32 goes to "1", and thereby the flip-flop 30 is put in the set state, that is, the bypass state.

Next, description is made on the case where transition of control state is made between the "bypass state" and the "bypass inhibit state".

(a) transition from the "bypass state" to the "bypass inhibit state".

When significant data exist in the data latches 6 and 7, that is, when the SEND output lines of the latch control parts 16 and 17 are both "1" (hereafter referred to as "clogged state") and no data is in transfer from the data latch 3 to the data latch 6, that is, when the ACK output line A6o of the transfer control part 16 is "1" and data is transferred from the input part to the data latch 3, the SEND output line S3o of the transfer control part 13 goes to "1", and thereby the output of the four-input NAND circuit 32 goes to "0" from "1". On the other hand, the SEND output line S3o of the transfer control part 13 which is one of inputs of the three-input NAND circuit 31 is turned to "0" from "1" by the inverting circuit 62, and therefore the output of the three-input NAND circuit 31 is changed from "0" to "1", and thereby the flip-flop 30 is changed from the set state (bypass state) to the reset state (bypass inhibit state).

This means that, as viewed from the data latch on the forward path (here, the latch 3), in the case where the data latch on the backward path which is bypass destination (here, the latch 6) and the following data latch (here, the latch 7) are in the "clogged" state, and data transfer in the bypass state has been completed, this state is changed to the "bypass inhibit state" when the subsequent data has arrived at the data latch 3 (the SEND output line, "0"→"1").

(b) Transition from the "bypass inhibit state" to the "bypass state"

In the case where no significant data exists in the data latch 2 (the SEND output S2o of the transfer control part 12 is "0"), the data latches on the loop-back part 130 side from the data latches 3 and 6 hold no significant data (the empty line E2 is "1") and the "clogged state" as described above in (a) is eliminated, and no significant data exists in the data latch 3 (the SEND output S3o of the transfer control part 13 is "0"), the output of the three-input NAND circuit 31 changes from "1" to "0". On the other hand, since the SEND output S3o goes to "0", the output of the four-input NAND circuit 32 changes from "0" to "1", and thereby the flip-flop 30 changes from the reset state (bypass inhibit state) to the set state (bypass state).

This means that as viewed from the data latch on the forward path (here, the latch 39) in the case where the data latch on the backward path which is bypass destination (here, the latch 6) and the data latch of the following stage (here, the latch 7) are empty, that is, not in the "clogged state", and the data latch on the loop-back part 130 side is empty, control changes to the "bypass state".

As is described above on the operation of this embodiment, with the configuration unit as the main subject, the transfer controlling operation, when aiming at one stage, if the data latches on the loop-back part 130 side therefrom are all empty, and the data latch configurating the shift register on the backward path which is bypass destination is not in the "clogged state", control is performed to make data bypass, and when a significant data exists on the loop-back part 130 side, or when the data latch configurating the shift register on the backward path which is bypass destination is in the "clogged state", control is performed to inhibit bypass and transfer data to the loop-back part 130 side.

In addition, in the above-mentioned embodiment, the case where significant data exist in the adjacent two data latches of bypass destination is determined as the "clogged state", but this state may judged by two or more data latches.

Also, the bypasses are provided between all the data latches configurating the shift register on the forward path and the data latches configuring the corresponding shift register on the backward path, but not always necessary to be installed between all the data latches, and the number of the data latches which configurate the shift register on the forward path and have no bypass has not always to be the same as the number of the data latches which configurate the shift register on the backward path and have no bypass line.

Figure 4:
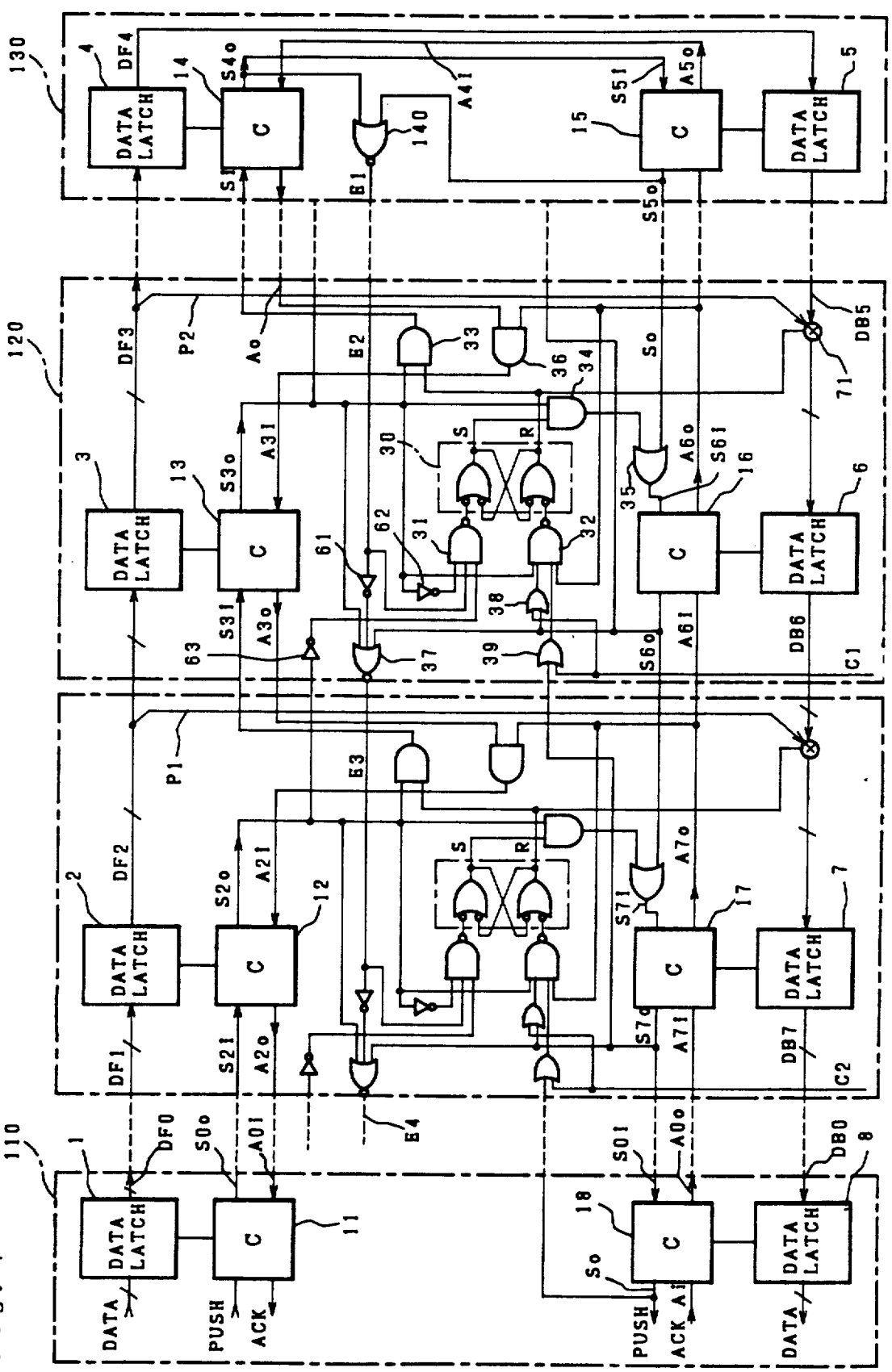
FIG. 4 is a circuit diagram showing an example of configuration of a data transmission apparatus in accordance with a second invention of the present invention.

FIG. 4 is a configuration view of on embodiment of a second invention of the present patent application.

Figure 1:
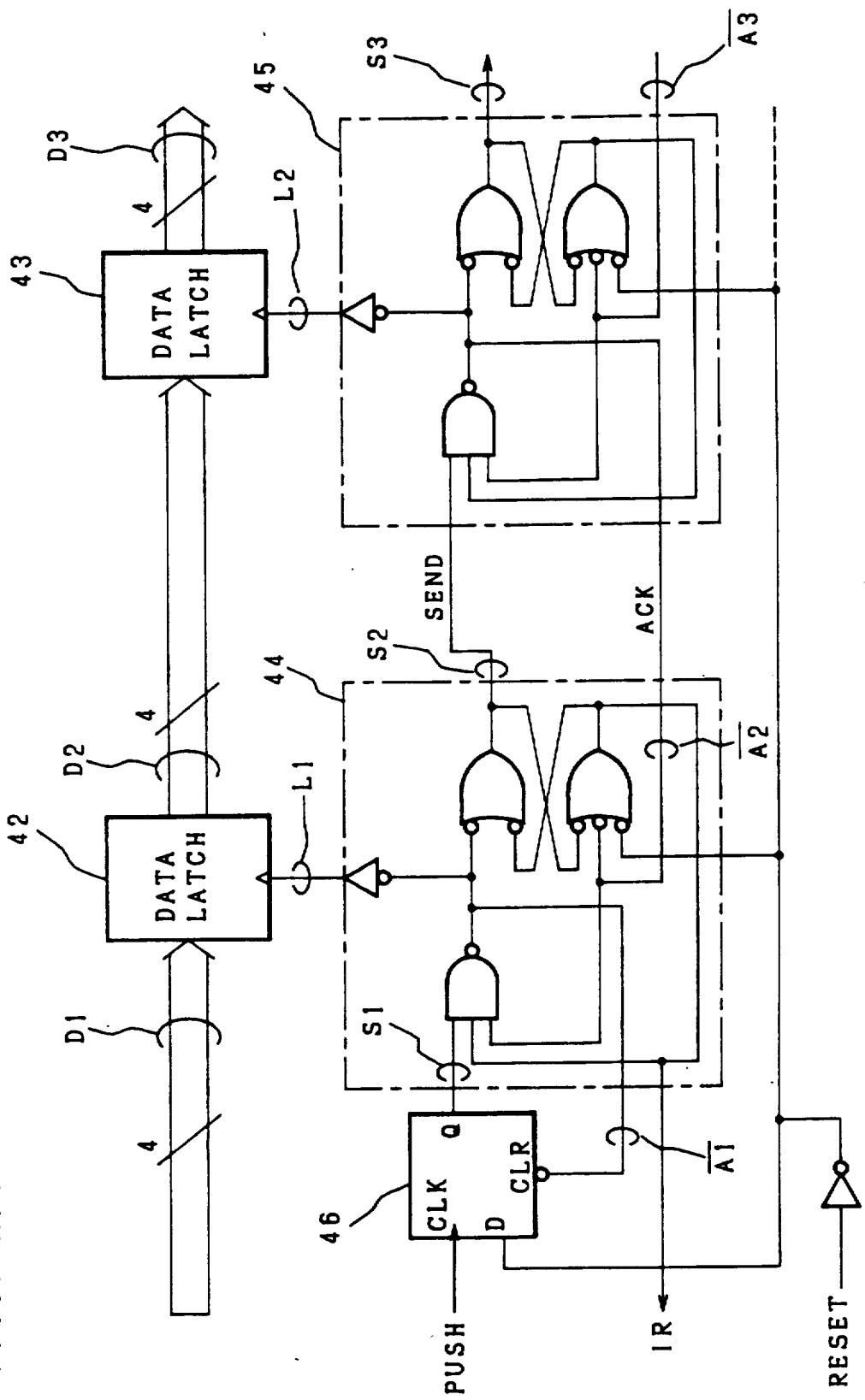
FIG. 1 is a circuit diagram showing a configuration of a conventional data transmission apparatus.
Figure 2:
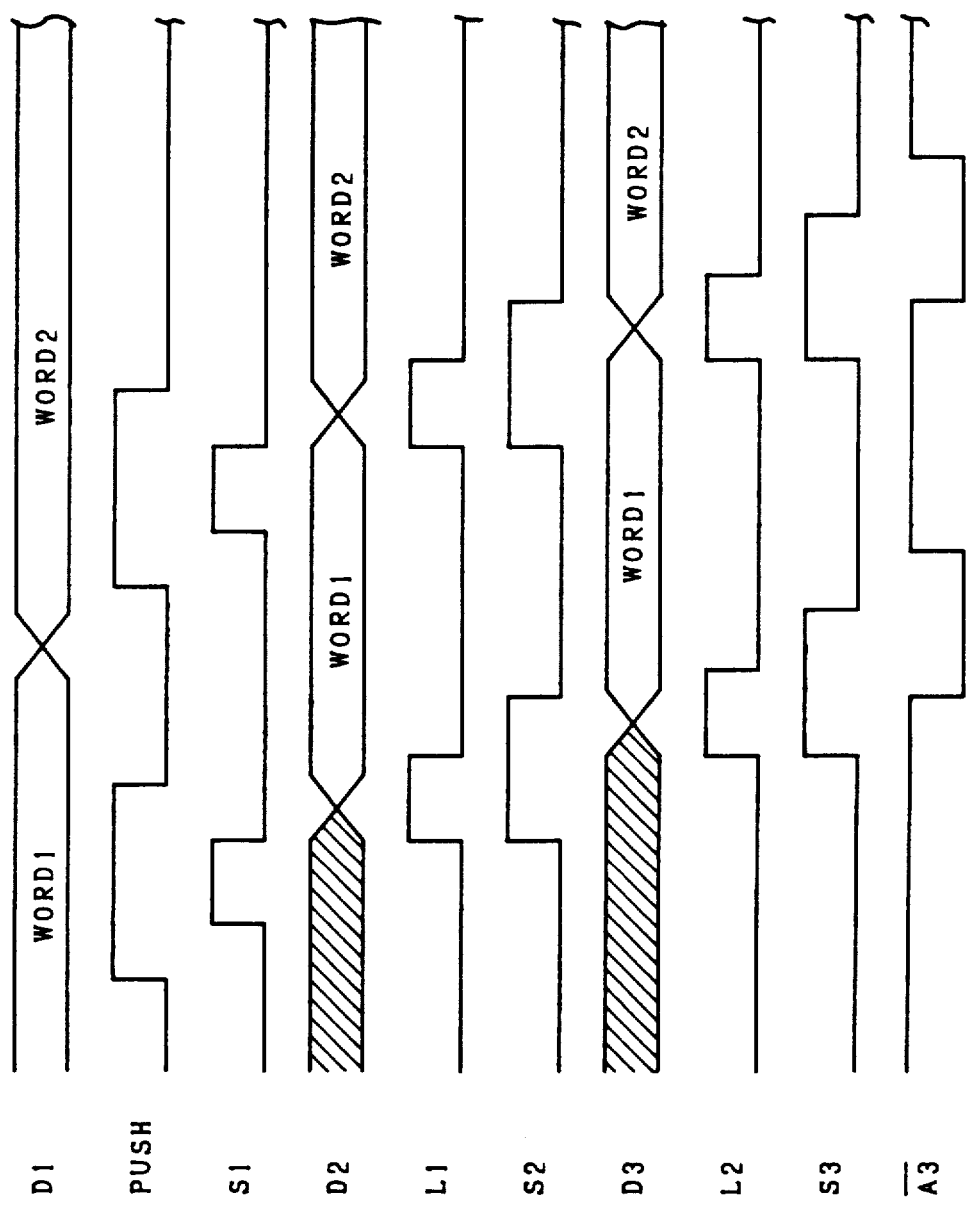
FIG. 2 is a timing chart showing an example of configuration of a data transmission apparatus in accordance with a first invention of the present invention.

An apparatus as shown in FIG. 4 has nearly the same configuration as that in FIG. 2, but in the repetitive unit, two-input OR circuits 38 and 39 are inserted in two input lines of the four-input NAND circuit 32, and the other input lines of these two-input lines of these two-input OR circuits are connected to a control signal line C1 from exterior.

Hereinafter, description is made on operation of the embodiment shown in FIG. 4 aiming at one configuration unit 120. As described above, the control states corresponding to the set state and the reset state of the flip-flop 30 are the "bypass state" and the "bypass inhibit state" respectively, but in the case where the control signal C1 inputted from exterior is "1", by the two-input OR circuits 38 and 39, the input lines of the four-input NAND circuits 32 which are the outputs thereof go to "1" all the time, therefore the "clogged state" is produced equivalently all the time.

Accordingly, even in the case where control is performed originally to be put in the "bypass state", control is performed to be put in the "bypass inhibit state" all the time by setting the external control input line C1 to "1". This means that control can be performed so as to inhibit bypass of that stage all the time by setting the control input line from exterior to "1". In addition, it is obvious that when the control input line C1 from exterior is "0", the same operation as in the embodiment shown in FIG. 3 is performed by the OR circuits 38 and 39.

Figure 5:
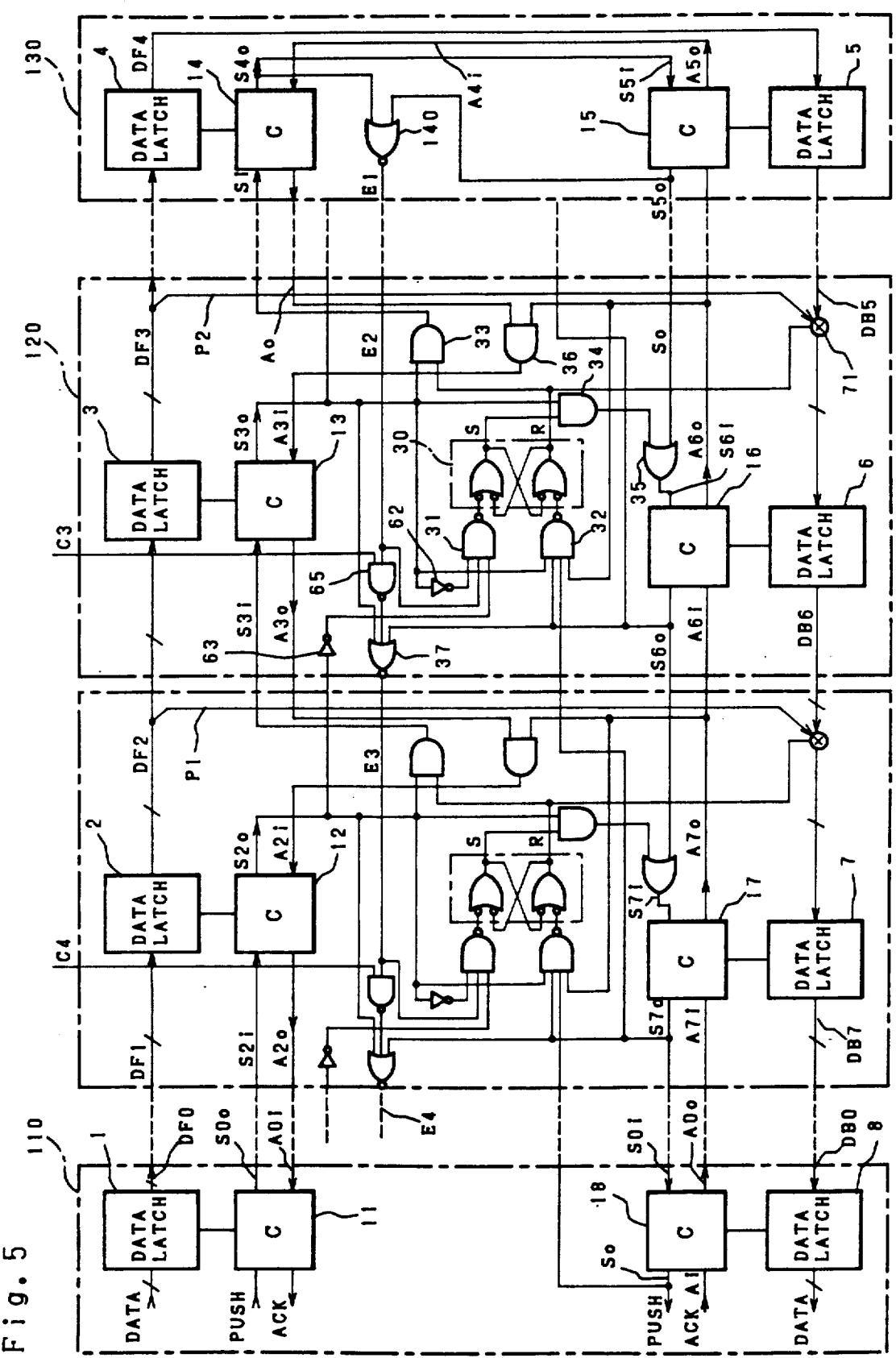
FIGS. 5 and 6 are circuit diagrams showing examples of configurations of other embodiments of the data transmission apparatus in accordance with the second invention.

FIG. 5 is a configuration view showing another embodiment of the second invention of the present patent application. In this embodiment shown in FIG. 5, the inverting circuit 61 in FIG. 3 is replaced with a two-input NAND circuit 65, and the other input of the two-input NAND circuit 65 is connected to a control line C3 inputted from exterior.

If the external control input line is "1", the same operation as in the embodiment shown in FIG. 3 and FIG. 4 is performed, but control can be performed so as to inhibit bypass in a desired stage of the repetitive part by operating the apparatus of this embodiment by a method described below.

This means that by performing initialization with the external control input line being set to "1", each stage is put in the "bypass state". Then, the "clogged state" is set, for example, by setting only a line C4 among the external control input lines to "0" and holding an ACK line A8i of the output part at "0". Therefore, data are inputted one after another from the input/output part 110, and then the first data bypasses the bypass line nearest the input/output part to reach the output part, but it stays in the output part without being outputted because the "clogging" is produced. Thereafter, every time data is inputted, the "clogging" of data spreads toward the loop-back part 130 side, and change of control to the "bypass inhibit state" is made from the stage near the input part, and finally all the stages are put in the "bypass inhibit state".

At this point, when all the data are outputted from the input/output part 110, that is, the "clogging" is eliminated, only the external control input line C3 is "0", and therefore the stages on the loop-back part 130 side from the configuration unit 120 are all "data is absent", and the empty signal to be inputted is "1", and control is performed to become the "bypass state", but in the stage comprising the data latches 2 and 7 and the stages on the input/output part 110 side therefrom, the empty signal to be inputted goes to "0", and therefore control is performed to stay intact in the "bypass inhibit state".

Accordingly, control can be performed so that data inputted next in the above-mentioned state bypasses through the bypass line P2.

In addition, it is obvious that if the external control lines C3 and C4 are held at "1", the same operation as in the embodiment shown in FIG. 3 is performed.

Figure 6:
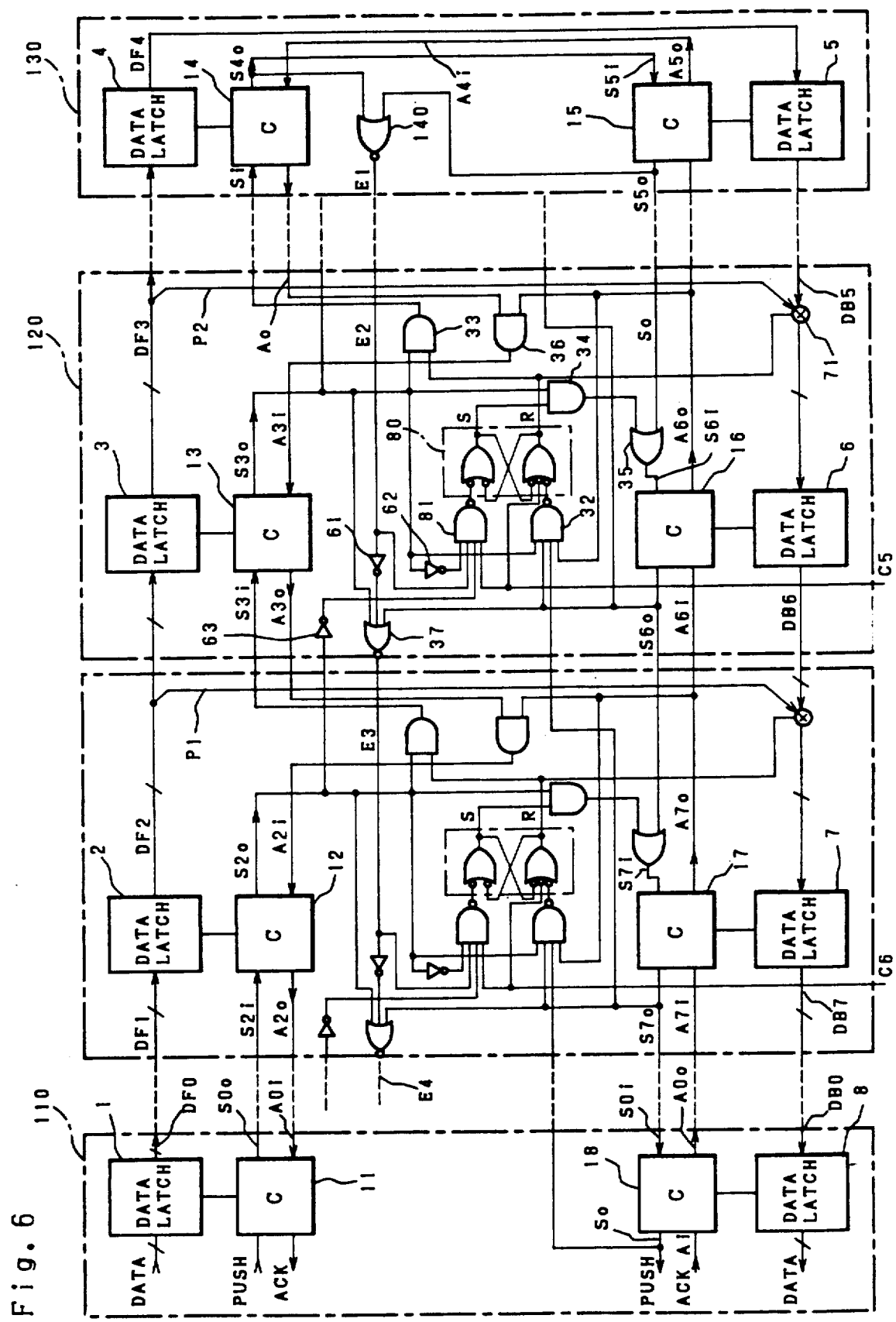

FIG. 6 is a configuration view showing still another embodiment of the second invention of the present patent application. In the embodiment shown in FIG. 3, the flip-flop 30 and the NAND circuit 31 in the configuration unit of the repetitive part are changed respectively, and control lines C5 and C6 inputted from exterior are inputted to a flip-flop 80 and a NAND circuit 82, respectively.

In such a configuration, when aiming at one configuration unit 120, by setting the external control line C5 to "0", the flip-flop 80 can be put in the reset state directly from exterior. Accordingly, by inputting the control signal from exterior, a desired configuration unit 120 of the repetitive part, that is, a desired stage of the shift register can be put in the "bypass inhibit state".

In addition, it is obvious that when the external control lines C5 and C6 are held at "1", the same operation as in the embodiment shown in FIG. 3 is performed.

As described above, in accordance with this first invention, in the case where data stops in the shift register on the output side of the data input/output part or the intermediate shift register, data inputted from the input part is buffer-stored, and in reverse, in the case where no data stops, the time required for data transfer can be reduced by passing the data through the bypass. Also, in accordance with the second invention, in addition to the above-described effect, opening and closing of a specific bypass can be controlled from exterior, and therefore additional effect is obtainable such that test of the circuit can be facilitated.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A data transmission apparatus including a first shift register having a plurality of stages forming a forward path of a data transmission line, a second shift register having a plurality of stages forming a backward path of the data transmission line and a loop-back part coupling an output part of the forward path and an input part of the backward path, comprising:
   a bypass for data transmission formed between an input of a first stage of the second shift register on the backward path and an output of a particular stage on the forward path;
   a first detecting means for detecting whether significant data is latched in any one of a second plurality of stages forming said forward path after said particular stage and forming said backward path before said first stage, said detecting means asserting a first signal if any one of said second plurality of stages has latched significant data;
   a second detecting means for detecting whether a data clog is present at said first stage on said backward path and for asserting a second signal if said data clog is present; and
   a controlling means, responsive to said first and second signals, for controlling data transmission through said bypass.

2. A data transmission apparatus as set forth in claim 1, wherein said first detecting means includes a circuit for a stage, wherein said circuit has as its output signal a logical sum of a signal indicating data is latched at said stage to be detected and said output signal of said circuit for the stage which is adjacent on the loop-back part side.

3. A data transmission apparatus as set forth in claim 1, wherein said second detecting means includes a circuit outputting a logical product of a particular number of signals indicating said data clog comprises a clog of a number of adjacent stages to said first stage, wherein the number of stages is equal to the number of signals.

4. A data transmission apparatus including a first shift register having a plurality of stages forming a forward path of a data transmission line, a second shift register having a plurality of stages forming a backward path of the data transmission line and a loop-back part coupling an output part of the forward path and an input part of the backward path, comprising:
- a bypass for data transmission formed between an input of a first stage of the second shift register on the backward path and an output of a particular stage on the forward path;
- a first detecting means for detecting whether significant data is latched in any one of a second plurality of stages forming said forward path after said particular stage and forming said backward path before said first stage, said detecting means asserting a first signal if any one of said second plurality of stages has latched significant data;
- a second detecting means for detecting whether a data clog is present at said first stage on said backward path and for asserting a second signal if said data clog is present;
- wherein the transmission line, said bypass and said first and second detecting means are disposed in a package; and
- a controlling means, responsive to said first and second signals and a third signal, for controlling transmission of said bypass, said third signal supplied from a source external to said package.

5. A data transmission apparatus as set forth in claim 4, wherein said first detecting means includes a circuit for a stage, wherein said circuit has as its output signal a logical sum of a signal indicating data is latched at said stage to be detected and said output signal of said circuit for the stage which is adjacent on the loop-back part side.

6. A data transmission apparatus as set forth in claim 4, wherein said second detecting means includes a circuit outputting a logical product of a particular number of signals indicating said data clog comprises a clog of a number of adjacent stages to said first stage, wherein the number of stages is equal to the number of signals.

7. A system for transferring data through a pipeline having a forward data path, a loop-back part and a backward data path, comprising:
- a plurality of stages, disposed successively, each comprising a first and a second station with each stage having said first station on the forward data path and said second station on the backward data path;
- each of said first and second stations receive, latch and transmit data, and include a data latch and means for controlling said data latch in response to a plurality of handshake signals from a previous station and a subsequent station, said plurality of handshake signals including a send signal;
- an input of said first station of each stage coupled to an output of said first station of an immediately previous stage and an output of said first station coupled to an input of said first station of an immediately subsequent stage to form said forward data path;
- an input of said second station of each stage coupled to an output of said second station of an immediately subsequent stage and an output of said second station coupled to an input of said second station of an immediately previous stage to form said backward data path;
- a data bypass coupled between an output of a selected stage's first station and an input of said selected stage's second station to permit data from said first station to be directed to said second station;
- means, coupled to said selected stage, for detecting whether significant data is latched in said second stations of a plurality of a predetermined number of stages, where said plurality of stages includes said selected stage and immediately adjacent previous stages, said detecting means asserting a first signal when the second stations of said plurality of stages have significant data latched;
- means, coupled to said selected stage, for determining whether significant data is latched in any one of the said first and second stations of any stages subsequent to said selected stage, said determining means asserting a second signal when any first and second stations of any stage have significant data latched; and
- means, coupled to said selected stage and responsive to said first and second signal, for directing data from said first station of said selected stage along said forward data path to a subsequent stage if either of said first and second signals are asserted.

8. The data transferring system of claim 7 wherein each of said plurality of stages includes said data bypass.

9. The data transferring system of claim 7 wherein said predetermined number of said plurality of second stations is exactly two.

10. The data transferring system of claim 8 wherein said predetermined number of said plurality of second stations is exactly two.

11. The data transferring system of claim 7 wherein the pipeline is disposed in a package and said directing means is further responsive to a third signal supplied from a signal source external to said package.

12. The data transferring system of claim 8 wherein the pipeline is disposed in a package and said directing means is further responsive to a third signal supplied from a signal source external to said package.

13. The data transferring system of claim 7 wherein said detecting means comprises logic circuitry to assert said first signal when said plurality of second stations assert concurrently respective send signals.

14. The data transferring system of claim 13 wherein said predetermined number of said plurality of second stations is exactly two.

15. The data transferring system of claim 13 wherein said logic circuitry comprises logic gates to produce a logical product of said respective send signals.

16. The data transferring system of claim 7 wherein said determining means comprises logic circuitry of an immediately subsequent stage which asserts said second signal when said immediately subsequent stage has a station which has significant data latched or when any stage subsequent to said immediately subsequent stage indicates significant data is latched in one of its stations.

17. The data transferring system of claim 16 wherein said predetermined number of said plurality of stages is exactly two.

18. The data transferring system of claim 16 wherein said logic circuitry comprises logic gates to produce a logical sum of a plurality of respective send signals asserted by any of said stations of said immediately subsequent stage and of an output of a determining means of a stage immediately subsequent to said immediately subsequent stage.

19. The data transferring system of claim 17 wherein said logic circuitry comprises logic gates to produce a logical sum of a plurality of respective send signals asserted by any of said stations of said immediately subsequent stage and of an output of a determining means of a stage immediately subsequent to said immediately subsequent stage.

20. The data transferring system of claim 7 wherein said detecting means comprises logic gates to produce a logical product of said plurality of second stations respective send signals and assert said first signal, wherein said predetermined number of said plurality of second stations is exactly two, wherein the pipeline is disposed in a package and said directing means is further responsive to a third signal supplied from a signal source external to said package and wherein said determining means comprises logic circuitry of an immediately subsequent stage which produces a logical sum and asserts said second signal when said immediately subsequent stage has a station which has significant data latched or when any stage subsequent to said immediately subsequent stage indicates significant data is latched in one of its stations by logically summing respective send signals asserted by any of its stations and of an output of a determining means of a stage immediately subsequent to said immediately subsequent stage.

* * * * *